United States Patent [19]
Kalua

[11] Patent Number: 5,523,790
[45] Date of Patent: Jun. 4, 1996

[54] MODULAR VIDEO WALL SYSTEM

[76] Inventor: Kevin A. Kalua, 750 Bell Canyon Rd., Angwin, Calif. 94508

[21] Appl. No.: 301,671

[22] Filed: Sep. 7, 1994

[51] Int. Cl.$^6$ .............................. H04N 5/64; H04N 9/12
[52] U.S. Cl. ..................... 348/383; 348/787; 348/836; 348/843; 312/10.1; 312/7.2
[58] Field of Search .................................. 348/787, 789, 348/839, 721, 722, 840, 839, 739, 788, 794, 841, 842, 843; 361/10.1, 7.2, 223.1, 682, 683, 724, 725, 726, 727, 829, 312; H04N 5/64, 5/66, 9/12, 9/64, 5/222

[56] References Cited

U.S. PATENT DOCUMENTS

| | | | |
|---|---|---|---|
| 3,450,454 | 6/1969 | Anders | 358/254 |
| 4,866,530 | 9/1989 | Kalua | 358/237 |
| 4,903,137 | 2/1990 | Wakasa | 348/383 |
| 5,119,271 | 6/1992 | Aoki et al. | 361/682 |
| 5,305,187 | 4/1994 | Umezu et al. | 361/829 |
| 5,363,149 | 11/1994 | Furuno et al. | 312/7.2 |

*Primary Examiner*—Safet Metjahic
*Assistant Examiner*—Nina N. West
*Attorney, Agent, or Firm*—Harris Zimmerman

[57] ABSTRACT

A large format video display includes modular construction to permit the repair and exchange of single modules. Each module includes a pair of enantiomorphic side panels, each including top and bottom flanges and a rear flange extending inwardly. At the front end of each rectangular side panel, a plurality of formed bends define an integral rectangular column extending outwardly from the panel. A generally rectangular bottom tray includes a rear floor portion for supporting a video projector unit aimed toward the front of the module. A pair of ears extend outwardly from the front ends of the side panels, and are configured each to be engaged with the integral column of the respective adjacent side panel. The bottom tray is dimensioned to engage the bottom flanges of the side panels, so that the side panels support the weight of the bottom tray and the video processor. A rear panel is secured to the rear flanges of the side panels and the bottom tray, and a top panel is joined to the upper flanges of the side panels and to the upper portions of the integral columns of the side panels. A medial panel extends between the side panels, the bottom tray, and the top panel, and is disposed midway between the front and rear of the module. The video projector unit beams the image through a central cutout in the medial panel to an image forming screen joined to the front of the assembly. The integral column formations extending of any two modular units in abutting, side-by-side relationship define a spacing or gap between confronting sides thereof. A plurality of structural beams extending vertically to impinge on the integral column portions of two adjacent modules. Adjacent modules are fastened to the beam disposed therebetween, forming adjacent columns of modules.

14 Claims, 6 Drawing Sheets

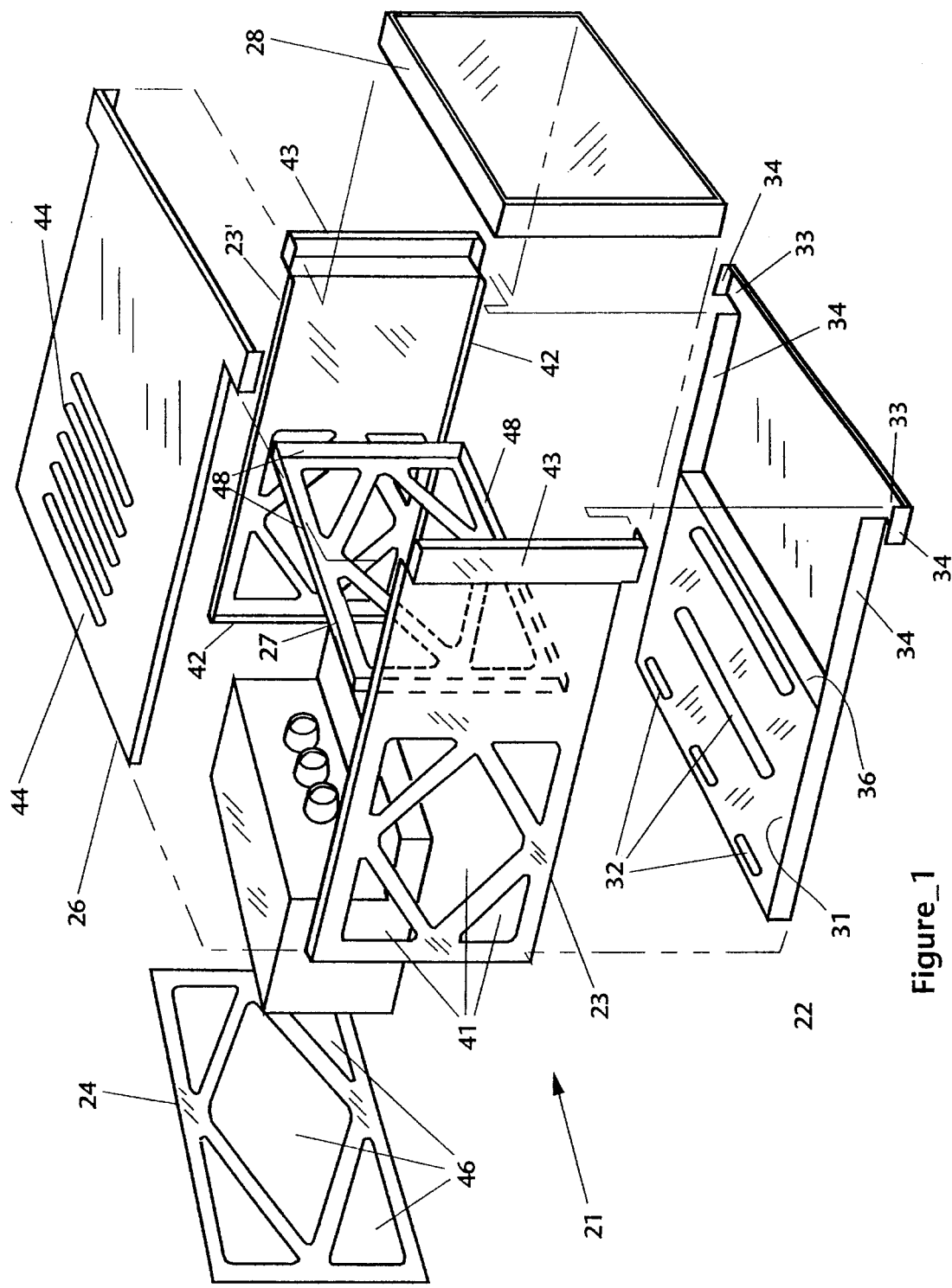
Figure_1

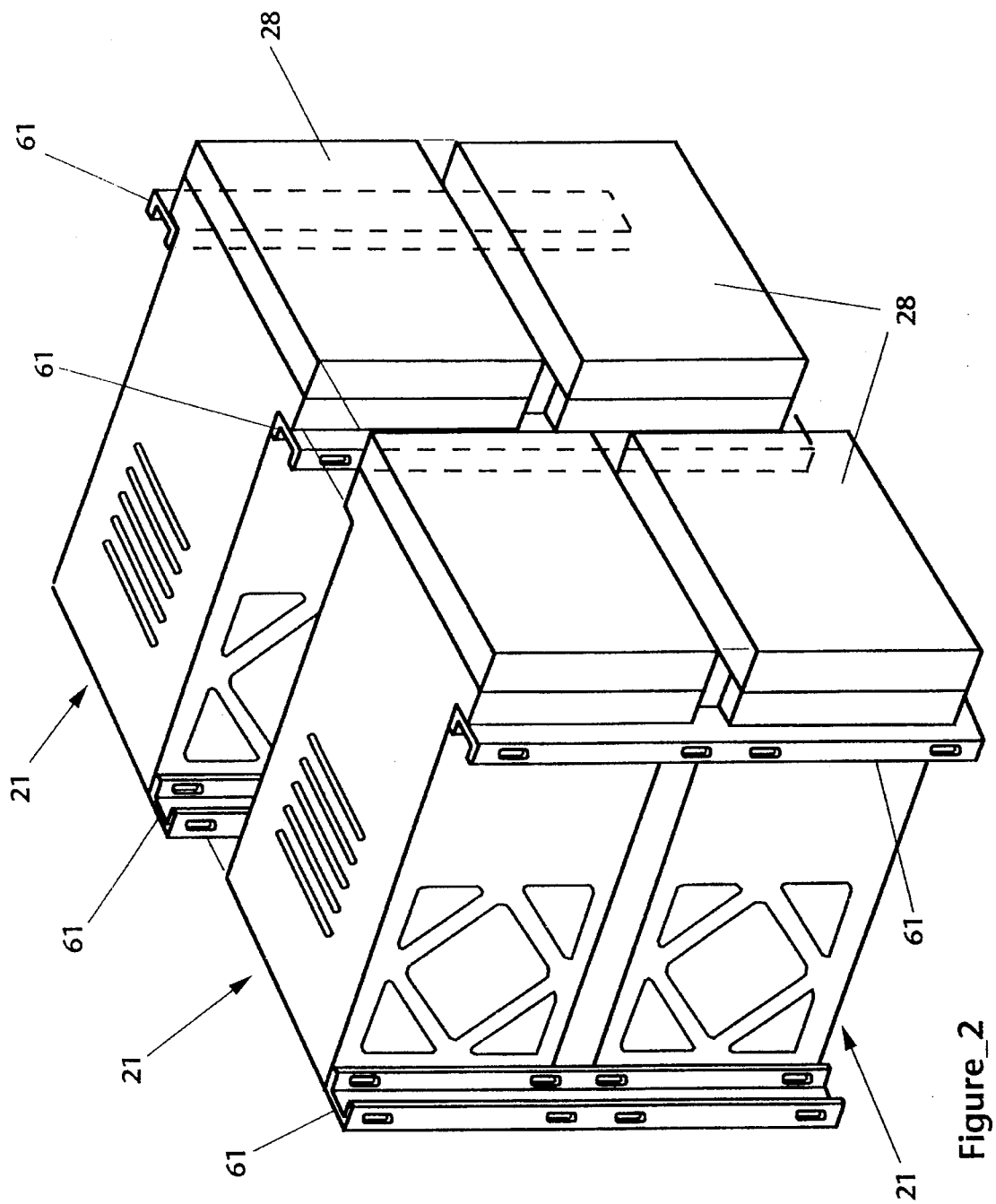

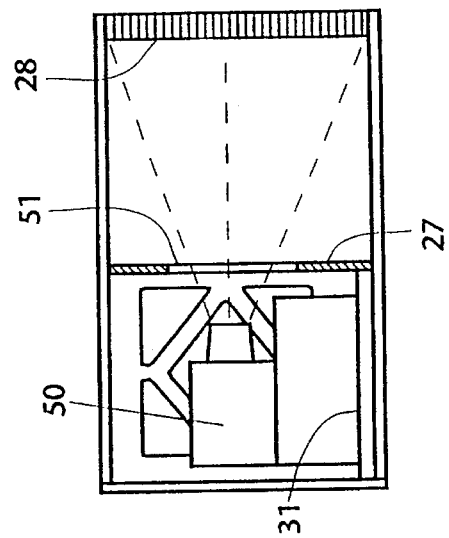
Figure_5
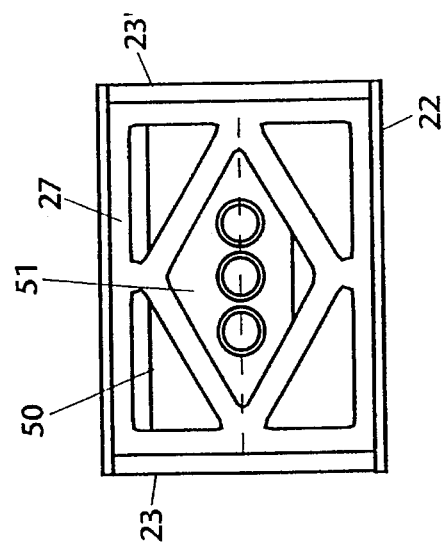
Figure_4
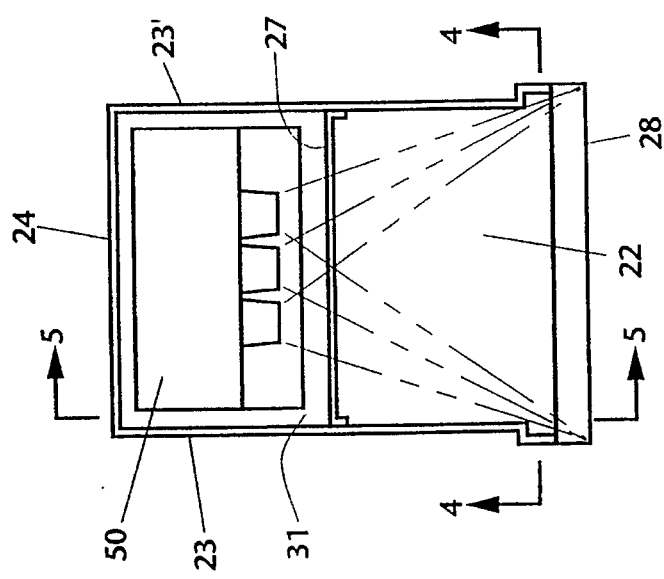
Figure_3

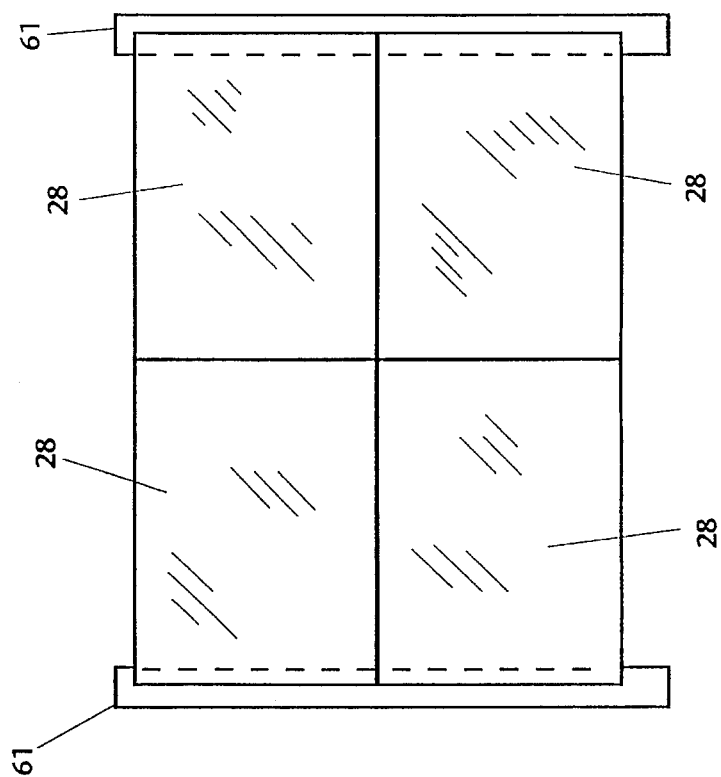
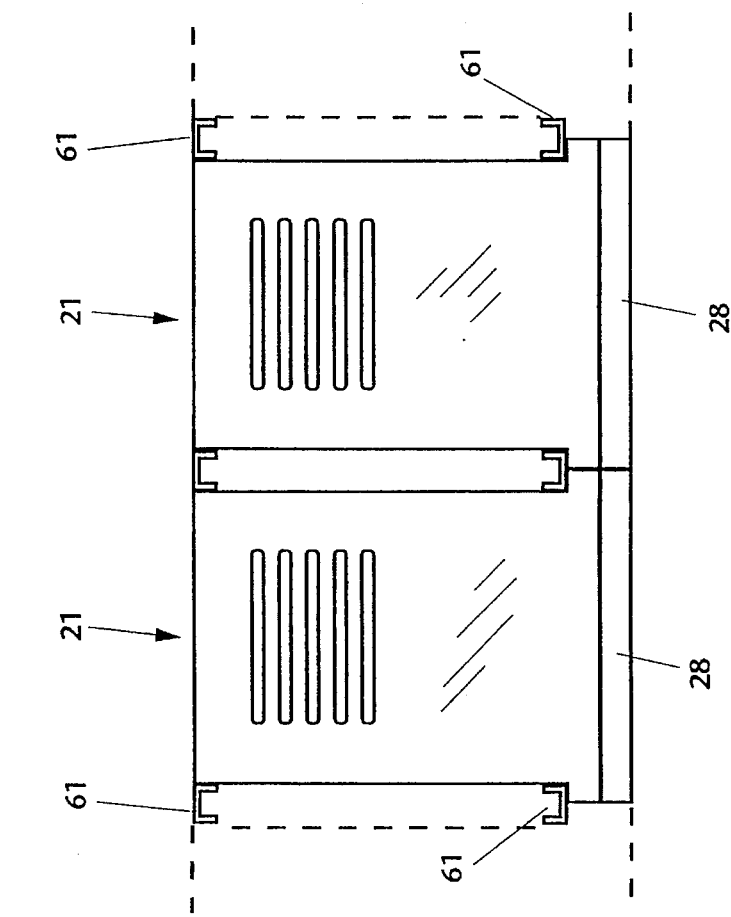

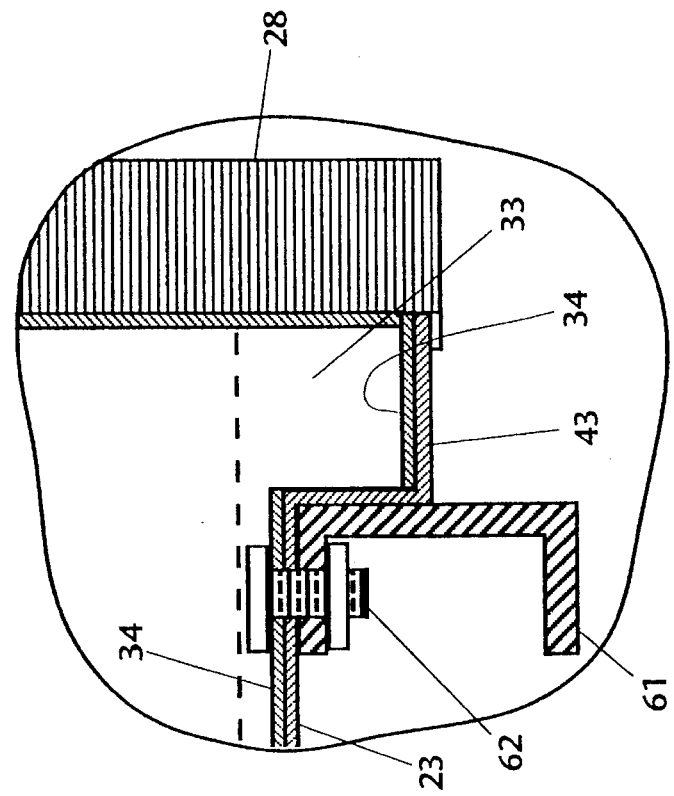
Figure_11
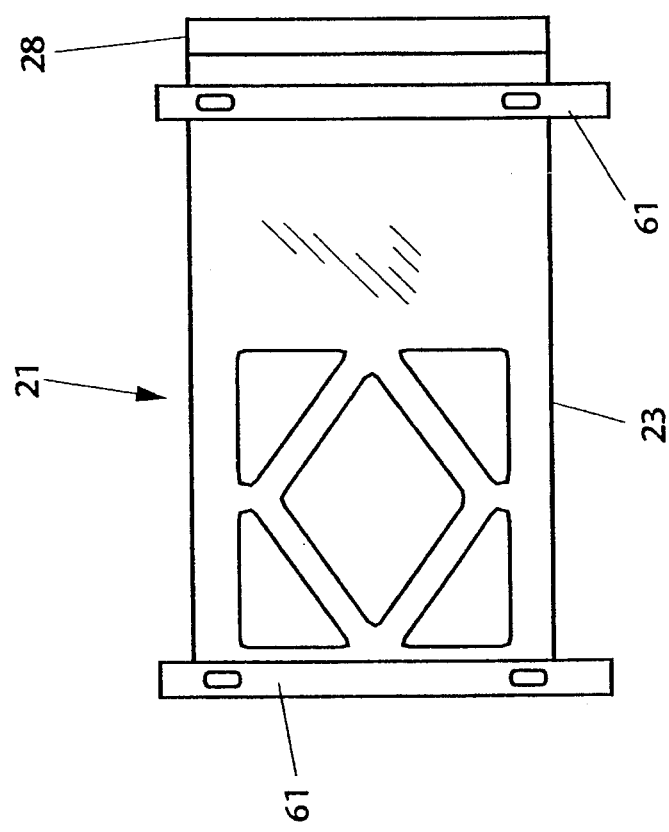
Figure_10

MODULAR VIDEO WALL SYSTEM

BACKGROUND OF THE INVENTION

In recent years large format video displays have become an accepted adjunct to public performances and public events. In sporting events held within stadiums, arenas and field houses, instant replay features and magnified views of the locus of sports action are an expected by the audience. Video displays are also used for popular music appearances, adding excitement, intimacy, and immediacy to the program material. In a business context, presentations at gatherings such as conventions and sales meetings are augmented by large video displays. Video is also now used routinely in institutional assemblies such as school graduations, corporate meetings, political speeches, and the like to dramatize the event. It is human nature to be attracted to a large format video display that presents color, sound and motion to the viewing audience. The large format display focuses on the center of action or attention, presenting an enlarged visualization of the important elements of the event that may not be visible to many of the attendees. Thus large video displays render live attendance even more immediate, and can recreate the feeling of live action at remote or delayed presentations.

Large video displays present unique problems in construction and maintenance. The displays are often placed in locations that are difficult to access, e.g., suspended from an arena ceiling, so that assembling and servicing the display is troublesome. The physics and economics of video displays dictate that a modular approach is optimal, in which a large number of modules are assembled, each presenting a portion of the total video image. The modules are heavy, and it is not easy to devise a support arrangement that is sufficiently lightweight to secure the modules in a stable matrix that can be suspended with absolute assurance of safety above a large number of people. The supports must also be capable of being lowered and rested on a surface for servicing without introducing stress on the components. Furthermore, each module should be accessible for quick servicing or replacement in the event of a component failure, so that the display may be repaired and operating with a minimum of down-time. A further requirement is ventilation within the assembled modules to remove the copious amounts of heat generated by the electronics and the video projection elements (generally high power CRT primary color projectors).

One example of a prior art video wall system is described in U.S. Pat. No. 4,866,530, issued Sep. 12, 1989 to Kevin Kalua. The present invention comprises an improvement over the prior art.

SUMMARY OF THE PRESENT INVENTION

The present invention generally comprises a large format video display that is highly modular in construction and adaptable to a variety of uses and installations. The modular arrangement permits the interchange and exchange of single units within the matrix, so that repair and servicing are accomplished with a minimum of down-time. The invention provides a structural arrangement that supports all of the modules in a stable matrix that is adaptable to suspension mounting or floor support with little or no modification. Further, the modular arrangement permits the formation of matrices of various numbers of columns and rows, as required by the installation and the end user.

Each modular unit is comprised of simple structural elements that serve both to enclose the video projector system and to support the weight of the module and its associated screen element. A pair of enantiomorphic side panels are provided, each formed of sheet metal or the like and including top and bottom flanges and a rear flange, all extending inwardly. At the front end of each rectangular side panel, a plurality of formed bends define an integral rectangular column extending outwardly from the panel. A bottom tray, also formed in generally rectangular shape of sheet metal or the like, includes a rear floor portion for supporting a video projector unit aimed toward the front of the module. A pair of ears extend outwardly from the front ends of the side panels, and are configured each to be engaged with the integral column of the respective adjacent side panel. The bottom tray includes a rear flange and opposed side flanges extending upwardly therefrom. The bottom tray is dimensioned to engage the bottom flanges of the side panels, so that the side panels support the weight of the bottom tray and the video processor.

A rear panel is secured to the rear flanges of the side panels and the bottom tray, and a top panel is joined to the upper flanges of the side panels and to the upper portions of the integral columns of the side panels. A medial panel extends between the side panels, the bottom tray, and the top panel, and is disposed midway between the front and rear of the module. The rear panel and the medial panel include cutouts that provide air circulation and define cross-braces which maintain rigidity of the assembly. The video projector unit beams the image through a central cutout in the medial panel toward the front of the module. Likewise, rear portions of the side panels include cutouts that permit air circulation and define cross-bracing, so that structural integrity is not compromised.

An image forming screen is joined to the front of the assembly, extending the entire height and width of the module. The screen receives the image beamed through the medial panel cutout by the video projector unit. The image displayed on the screen may comprise a small portion of the unitary image presented by the entire modular array, or a portion of an image presented by a subset of the array, or an entire image presented in conjunction with other video information provided by the remainder of the matrix of modules. These effects are determined by the video driving circuitry, many examples of which are known in the prior art, and the creativity and artistry of the video director.

The integral column formations extending outwardly from the side panels determine that the front end of each module is wider that the remainder thereof. Any two modular units disposed with their front portions (and screens) in abutting, side-by-side relationship define a spacing or gall between confronting sides thereof. The matrix array includes a plurality of structural beams or channel members, each extending vertically and disposed to impinge on the integral column portions of two adjacent modules. Adjacent modules are fastened to the beam disposed therebetween, forming adjacent columns of modules. The vertical beams are joined by horizontal members at the periphery of the matrix to define the video matrix.

It is significant that each of the modules is accessible individually for service or replacement without interference by adjacent modules. The screen or back panel of any module may be removed for ingress into any module. Likewise, any module may be unfastened from the vertical support beams and removed from the video matrix without obstruction by adjacent modules. It is also important that the construction of the matrix provides ample flow space for ventilation of the modules, so that heat is easily removed from the video projection units.

BRIEF DESCRIPTION OF THE DRAWING

FIG. 1 is an exploded perspective view of a video module constructed in accordance with the invention.

FIG. 2 is a partially exploded perspective view of a video display employing a 2×2 modular matrix.

FIG. 3 is a top view (top panel removed) of a single video module of the invention.

FIG. 4 is a cross-sectional elevation of a single video module, taken along line 4—4 of FIG. 3.

FIG. 5 is a cross-sectional elevation of a single video module, taken along line 5—5 of FIG. 3.

FIG. 6 is a top view depicting the assembly of two adjacent video modules in a video display matrix of the invention.

FIG. 7 is a front elevation depicting the assembly of the modules in a 2× 2 video display matrix.

FIG. 10 is a side elevation of a video module assembled to the vertical supports of a video display matrix.

FIG. 11 is an enlarged cross-sectional view of the assembly of the vertical support with the integral column formation of a video module, taken along line 11—11 of FIG. 10.

DESCRIPTION OF THE PREFERRED EMBODIMENT

Figure 9:
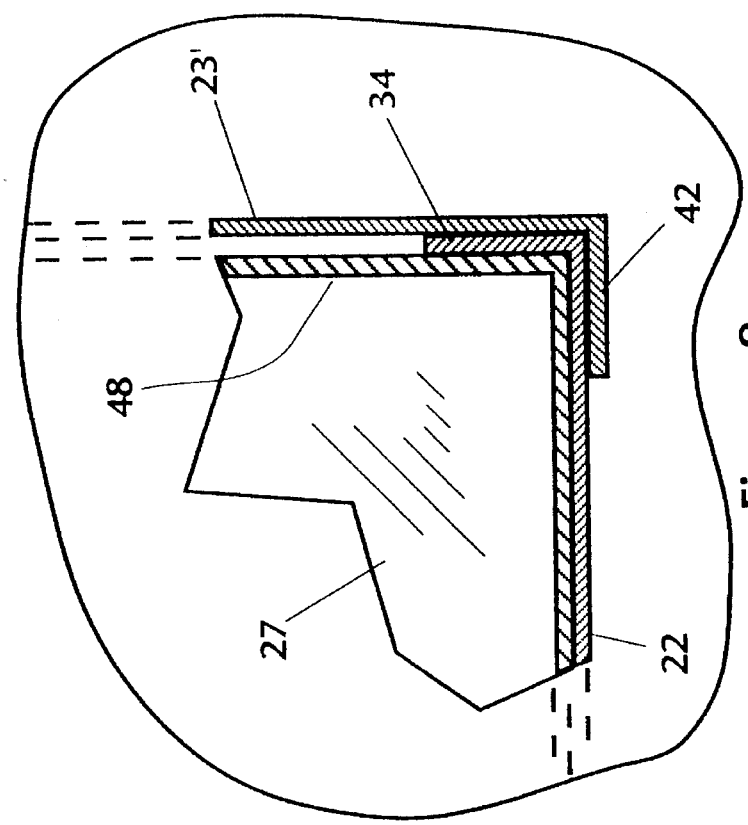
FIG. 9 is an enlarged partial cross-sectional view of the engagement of the bottom of the side panel, the medial panel, and the bottom tray of a video module.

The present invention generally comprises a large format video display that features a plurality of individual modules assembled in a video matrix, each module producing a respective portion of the overall video presentation. With regard to FIG. 1, each module 21 comprises a housing constructed of structural components including a bottom tray 22, a pair of side panels 23 and 23', a rear panel 24, a top panel 26, a medial panel 27, and an image-forming screen 28 secured to the front of the assembly. All of these components, with the exception of the screen 28, may be fabricated of formed sheet metal or the like. The housing also serves as the structural support for the module 21.

The bottom tray 22 is generally rectangular, and includes a raised floor 31 extending from the rear edge to a medial portion of the tray. Ventilation holes 32 are formed in the floor 31 to permit the passage of cooling air through the module. At the front edge of the tray 22, a pair of ears 33 extend laterally outwardly. Flanges 34 extend upwardly from the side edges of the ears 33 as well as the portion of the tray forward of the raised floor 31. A drop flange 36 depends from both side edges, as well as from the rear edge and front edge of the raised floor 31.

Figure 8:
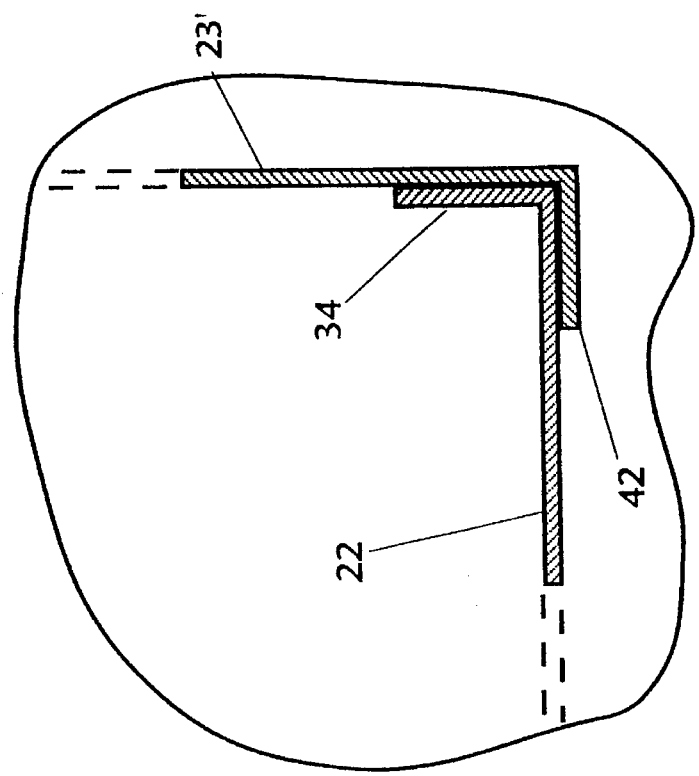
FIG. 8 is an enlarged partial cross-sectional view of the engagement of the bottom of the side panel and the bottom tray of a video module.

The side panels 23 and 23' are formed in mirror image fashion. Each includes a rear portion having cutouts 41 which define cross-braces to maintain rigidity while providing ample flow space for ventilation. Flanges 42 extend inwardly from the top, rear, and bottom edges of the side panels. At the front of each side panel, a integral rectangular column 43 is formed by vertically extending bends in the sheet material, as also shown in FIG. 11. The side panels 23 and 23' are dimensioned so that the bottom tray 22 is positioned between the side panels, with the side edges of the tray 22 resting on the bottom flanges 42 of the side panels, as shown in FIG. 8. Thus the weight supported by the bottom tray 22 is transferred to the side panels 23 and 23'. Fasteners are secured through the side panels and flanges 34 (and 36) to join these components. The ears 33 at the front of the tray 22 are disposed within the bottom of a respective integral column 43, the columns 43 providing vertical load support and torsional stability.

The top panel 26 is a planar member having generally the same plan configuration as the bottom tray, with similar ears which engage the top portions of integral columns 43 of the side panels. It is fastened to the upper flanges of the side panels 23 and 23', as well as the top flanges of the columns. The top panel is provided with a plurality of ventilation slots 44 to permit outflow of hot air from the module housing.

The rear panel 24 is a rectangle dimensioned to extend between the rear edges of the top panel 26 and bottom tray 22, and the sides 23 and 23'. It is provided with cutouts 46, similar to the cutouts 41 of the side panels, which enable ventilation while defining cross-bracing for structural purposes. The rear panel 24 is fastened to the rear flanges of the side panels, and to the drop flange 36 at the rear of the raised floor of the bottom tray 22. The medial panel 27 is configured similarly to the rear panel, and is likewise dimensioned to extend within the sides and top panel and bottom tray. The medial panel further includes a flange 48 extending forwardly from the entire periphery thereof, providing sufficient area for fasteners to join the medial panel the sides, top panel and bottom tray, as shown in FIG. 9.

The screen 28 is joined to the front edges of the top panel and bottom tray, and to the front edges of the integral columns 43 of the side panels, as also shown in FIG. 11. The screen may comprise any one of many forms of rear projection screen known in the prior art and adapted to project a color image in a defined solid angle toward the viewing audience.

Throughout this description, references to fasteners are intended to include bolts and screws, sheet metal screws, self-tapping threaded fasteners, and the like. Quick release toggles may also be used for some fastener functions to permit quick access to the module for servicing.

With additional reference to FIGS. 3–5, a video projector unit 50 is installed within the module. The projector 50 is secured on the raised floor 31, with the image directed through the cutout 51 of the medial panel 27 toward the screen 28 at the front of the unit. The projector may comprise a three-unit CRT assembly that beams the primary color images to converge on the screen 28, or may comprise any other image forming device known in the prior art. The weight of the projector unit is supported by the raised floor 31 and transferred to the rear and medial panels, and thence to the side panels. Thus the components which form the housing of the module also comprise the primary structural components thereof.

The invention further comprises a plurality of modules 21 assembled in a regular matrix to form a video display. As shown in FIGS. 2, 6, 7, and 10, the modules are configured to be disposed with the screen elements of each in side-to-side and top-to-bottom abutment, so that there is no perceptible interruption in the image presented by the group of screens. The modules 21 are joined by a plurality of support beams or channels 61 extending vertically between adjacent modules. The integral column formations 43 extending from each side of each module determine that there is a gap between the confronting side panels of adjacent modules, even though the screens are in abutment. Each beam or channel 61 is disposed to impinge on the front of two adjacent units at the point where the integral column 43 extends outwardly. Fasteners 62 extend through the beam and are secured in each module through the side panel 23. Likewise, another beam or channel 61 is secured to the rear of the side panels of each pair of adjacent modules by similar fasteners, so that all the weight of the modules is transferred to the beams 61. The beams are joined at their opposed ends to lateral frame members which maintain the rectilinear alignment of the matrix.

It is significant that each module 21 is accessible for servicing without interference from any adjacent module. The screen 28 or rear panel of any module may be removed without removing the module from the matrix. Thus a malfunctioning video projector unit or a screen may be replaced quickly and easily. The minimum matrix size is 2×2, and there is no theoretical limit to the matrix size. If the numbers of columns and rows remains equal, the aspect ratio of each single module is maintained. For some purposes, such as traveling sign displays and custom installations, the numbers of rows may exceed the number of columns, or vice versa, to create a unique visual display.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

I claim:

1. A large format video display, including:

a plurality of video modules, each of said modules including an image forming screen, video projector means for illuminating said screen with a video image in rear projection fashion, housing means for enclosing said video projector means and securing said screen, said housing means also comprising structural means for supporting said video projector means and said screen;

said housing means including a bottom tray having means for engaging said video projector means in supporting relationship; and, said means for engaging including a raised floor portion of said bottom tray.

2. A large format video display, including:

a plurality of video modules, each of said modules including an image forming screen, video projector means for illuminating said screen with a video image in rear projection fashion, housing means for enclosing said video projector means and securing said screen, said housing means also comprising structural means for supporting said video projector means and said screen;

said housing means including a bottom tray having means for engaging said video projector means in supporting relationship;

said bottom tray including opposed side edges, and a pair of ear portions extending laterally outwardly from a front portion of said side edges, said ear portions being spaced apart a distance generally the same as the width of said screen.

3. The large format video display of claim 2, further including a pair of side panels extending generally parallel and upwardly from said side edges of said bottom tray.

4. The large format video display of claim 3, further including a column portion formed at a front portion of each of said side panels, said column portion engaging and securing a respective one of said ear portions of said bottom tray.

5. The large format video display of claim 4, wherein said column portions of said side panels are spaced apart a distance generally the same as said width of said screen.

6. The large format video display of claim 5, further including a first plurality of support beams extending between and joining vertically stacked modules to form columns of said modules, said columns joined side-by-side to define a matrix of said modules, the screen of each module disposed in side-by-side and top-to-bottom edge abutment with adjacent screens in said matrix.

7. The large format video display of claim 6, wherein each of said first plurality of support beams extends in abutment to confronting column portions of a pair of adjacent modules in said matrix.

8. The large format video display of claim 7, wherein each of said first plurality of support beams extends in abutment to confronting side portions of a pair of adjacent modules in said matrix, and means for securing said confronting side portions to said first plurality of support beams.

9. The large format video display of claim 8, further including a second plurality of support beams extending between and joining vertically stacked modules to form columns of said modules, said second plurality of support beams each extending in abutment to confronting rear side portions of a pair of adjacent modules in said matrix, an means for securing said support beams to said confronting rear side portions.

10. The large format video display of claim 3, wherein each of said side panels includes a flange extending along a bottom edge thereof, said flange disposed to extend below a portion of said bottom tray in supporting relationship.

11. The large format video display of claim 10, further including a top panel secured to the upper edges of said side panels.

12. The large format video display of claim 11, further including a rear panel secured to the rear edges of said side panels.

13. The large format video display of claim 12, further including a medial panel disposed medially between said rear panel and said screen and extending to be secured to said side panels, said bottom tray, and said top panel.

14. The large format video display of claim 13, wherein said medial panel is disposed between said video projector means and said screen, and further including a central cutout positioned to pass the image beam from said video projector means to said screen.

* * * * *